US008658552B2

(12) United States Patent
Prior et al.

(10) Patent No.: US 8,658,552 B2
(45) Date of Patent: Feb. 25, 2014

(54) CHROMIA-CONTAINING REFRACTORY (75) Inventors: H. David Prior, Bethel Park, PA (US);
Glenn H. McIntyre, III, Pittsburgh, PA (US)

(73) Assignee: Harbison-Walker Refractories Company, Moon Township, PA (US)

(*) Notice: Subject to any disclaimer, the term of this patent is extended or adjusted under 35 U.S.C. 154(b) by 445 days.

(21) Appl. No.: 12/645,572

(22) Filed: Dec. 23, 2009

(65) Prior Publication Data
US 2011/0152059 A1 Jun. 23, 2011

(51) Int. Cl.
C04B 35/00 (2006.01)
C04B 35/52 (2006.01)

(52) U.S. Cl.
USPC .............. 501/132; 501/99; 501/126; 501/127

(58) Field of Classification Search
USPC ............................ 501/99, 100, 126, 127, 132
See application file for complete search history.

(56) References Cited

U.S. PATENT DOCUMENTS

| | | | | |
|---|---|---|---|---|
| 3,829,541 A | * | 8/1974 | Farrington et al. | 264/674 |
| 4,001,029 A | * | 1/1977 | Cassens, Jr. | 501/125 |
| 4,374,897 A | * | 2/1983 | Yamaguchi | 428/446 |
| 5,106,795 A | * | 4/1992 | Drake et al. | 501/126 |
| 6,355,338 B1 | * | 3/2002 | Hilmas et al. | 428/297.1 |
| 6,899,777 B2 | * | 5/2005 | Vaidyanathan et al. | 156/89.11 |
| 7,396,789 B2 | * | 7/2008 | Champion et al. | 501/103 |

FOREIGN PATENT DOCUMENTS

| | | |
|---|---|---|
| JP | 5117485 | 5/1993 |
| JP | 2001064036 | 3/2001 |
| JP | 2003113321 | 4/2003 |
| KR | 100920086 | 10/2009 |

OTHER PUBLICATIONS

Int'l Search Report and Written Opinion from corresponding Int'l (PCT) Application No. PCT/US2010/061408 dated Aug. 25, 2011. 7 pages.

* cited by examiner

*Primary Examiner* — Noah Wiese
(74) *Attorney, Agent, or Firm* — Kusner & Jaffe (57) ABSTRACT

A high-chromia refractory, comprised of:
about 60% to about 99% by weight of refractory grain, wherein the refractory grain is comprised of grains having about 20% to 100% by weight chromia;
0% to about 35% by weight of a fine particulate, the fine particulate selected from chromic oxide, alumina, ceria, yttria, lanthanum oxide, or combinations thereof; and
about 1% to about 8% of a liquid resin or pitch.

17 Claims, 8 Drawing Sheets

REFRACTORY COMPOSITION NO. 1 UNALTERED INTERIOR; 400X

FIG. 1

CONVENTIONAL 90% $Cr_2O_3$-CONTENT BURNED CHROMIA-ALUMINA BRICK UNALTERED INTERIOR; 400X

REFRACTORY COMPOSITION NO. 3 HOT FACE; 400X

CHROMIA-CONTAINING REFRACTORY

FIELD OF THE INVENTION

The present invention relates generally to refractories and, more particularly, to high-chromia refractories.

BACKGROUND OF THE INVENTION

Refractories are used in numerous high-temperature, corrosive applications. One particularly difficult application is slagging coal gasifiers. Slagging coal gasifiers have highly-fluid and chemically-corrosive slags. These slags are among the most aggressive types encountered by refractories. The only category of refractories that are able to resist the highly corrosive conditions in slagging coal gasifiers is burned bricks that contain high amounts of chromic oxide. Typically, the burned-brick refractories used in slagging coal gasifiers are comprised of chromia-alumina, wherein the chromic oxide content may range from 20 to 100% by chemical analysis. The chromia-containing aggregate within these refractories may be sintered or fused, or combinations of sintered and fused materials. It is known to add fine chromic oxide to the matrix of the brick to improve slag resistance. U.S. Pat. No. 6,815,386 to Kwong et al. describes the addition of phosphates to burned brick with high chromia content to improve resistance to slag penetration.

High-chromia refractories are very expensive, and ways of improving the performance and useful life of these materials are being sought. Despite efforts to improve the performance of burned brick with high chromia contents, there is a continuing need for improvement, particularly with respect to slag penetration.

It is known that the addition of carbon to refractories in general limits slag penetration and improves corrosion resistance. In this respect, the non-wetting nature of carbon limits the penetration of liquid slag to a thin oxidized zone at the hot face of a refractory. This thin oxidized zone will vary in depth, but it is not unusual for the oxidized zone to be limited to several millimeters or less. (In contrast, carbon-free refractories typically exhibit much greater slag penetration, sometimes exceeding 75 millimeters).

However, the use of carbon in high-chromia brick such as chromia-alumina refractories used in slagging coal gasifiers has not heretofore been practiced. It has been believed by those skilled in the art that chromia, in the presence of carbon, will be reduced to chromium metal by the carbon at the high temperatures that are characteristic of the operation of slagging coal gasifiers. In this respect, temperatures can reach 1600° C. in slagging coal gasifiers. The reduction of chromia to chromium metal would be expected to have deleterious effects on the refractory lining.

The present invention overcomes these and other problems and provides a chromia-alumina brick containing carbon having improved resistance to slag penetration.

SUMMARY OF THE INVENTION

In accordance with a preferred embodiment of the present invention, there is provided a high-chromia refractory, comprised of:

about 60% to about 99% by weight of refractory grain, wherein the refractory grain is comprised of grains having about 20% to 100% by weight chromia;

0% to about 35% by weight of a fine particulate, the fine particulate selected from chromic oxide, alumina, ceria, yttria, lanthanum oxide, or combinations thereof; and about 1% to about 8% of a liquid resin or pitch.

In accordance with another aspect of the present invention, there is provided a refractory as described above, further comprising:

up to about 10% carbon; and up to about 8% metal powders, said metal powders selected from Si, Al, Fe, Cr, Mg, alloys of Si, Al, Fe, Cr, Mg, or combinations thereof.

In accordance with yet another aspect of the present invention, there is provided a refractory, comprised of:

about 60% to about 99% by weight of chromia-alumina grain, wherein said chromia-alumina grain is comprised of grains having chromia contents of about 20% to about 100% by weight;

about 1% to about 8% resin or pitch;

up to about 10% of a carbonaceous material;

up to about 8% metal powders selected from Si, Al, Fe, Cr, Mg, alloys of Si, Al, Fe, Cr, Mg or combinations thereof;

up to about 35% of a fine particulate selected from chromic oxide, alumina, ceria, yttria, lanthanum oxide, or combinations thereof; and up to about 35% picrochromite.

The invention utilizes fused and/or sintered chromia-alumina grains with a resin binder or pitch, and added metals. The refractory is heat treated at low temperatures (less than about 260° C.).

An advantage of the present invention is a chromia-alumina brick having improved resistance to slag penetration.

Another advantage of the present invention is a chromia-alumina brick that finds advantageous application in a slagging coal gasifier.

Another advantage of the present invention is a chromia-alumina brick as described above that is heat treated at relatively low temperatures during manufacture.

Another advantage of the present invention is a chromia-alumina brick as described above that includes carbon.

These and other advantages will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

The following description is for the purpose of illustrating preferred embodiments of the invention only and not for the purpose of limiting same.

A refractory is comprised of:

about 60% to about 80% by weight of a grain consisting of about 20% to 100% by weight chromia;

up to about 35% by weight of a fine particulate, the fine particulate selected from chromic oxide, alumina, ceria, yttria, lanthanum oxide, or combinations thereof; and about 1% to about 8% of a liquid resin or pitch.

The refractory described above may further include:

up to about 10% carbon; and up to about 8% metal powders, said metal powders selected from Si, Al, Fe, Cr, Mg, alloys of Si, Al, Fe, Cr, Mg, or combinations thereof.

The grain used in forming the refractory is preferably chromia-alumina grain. In one embodiment of the invention, "coarse grain" is used. As used herein, the term "coarse grain" refers to a grain having a particle size of between about 3 Tyler mesh (6.70 mm) and 325 Tyler mesh (45 μm), although in practice some portion will be finer than 325 Tyler mesh because some fine material is generated during normal crushing and grinding operations in preparing the coarse grain for brick making. The coarse grain used in a composition according to the present invention may be sintered, fused or combinations of sintered and fused grain. The coarse chromia-containing grain of the present invention is preferably comprised primarily of chromia-alumina grain.

As will be appreciated by those skilled in the art, the grains used in forming the refractory need not all have the same chromia content. A refractory may be formed by mixing or blending grains that each have different chromia content, e.g., mixing grains, having 70% chromia with grains having 85% chromia. In this respect, grains having different amounts of chromia therein may be mixed or blended to have the desired range of chromia in the resultant refractory. In a preferred embodiment, the refractory grain(s) used in forming the refractory have about 20% to about 100% chromia. In a more preferred embodiment, the refractory grain(s) used to form the refractory have about 65% to about 100% by weight chromia.

It is also contemplated that a portion of the "grain" used in forming the refractory is comprised of fine chromia-containing grains, such as ball-milled chromia-alumina grain. It is contemplated that a refractory according to the present invention could be made with graded aggregates and/or milled aggregates. The grain used in forming the refractory may also be comprised of picrochromite. It will be appreciated by those skilled in the art that a range of particles sizes from coarse to fine will be needed to manufacture the refractory.

Alumina grains containing 90% to 100% aluminum oxide by chemical analysis may be substituted for a portion of the chromia-alumina grain. Magnesia-chrome grains may also be used as partial substitutes for the base chromia-alumina grains. By way of example and not limitation, the magnesia-chrome grains may be obtained by electrical fusion of magnesia and chrome ore, or may be of a purer form, such as picrochromite. Substitute grains, such as alumina aggregate or magnesia and/or chrome aggregate, preferably comprise less than 50% by weight of the grain.

As used herein, the term "fine particulate" refers to refractory particulate having a particle size less than about 65 Tyler mesh (212 μm). The fine particulate identified above may be of a pure variety or may contain normal contaminants as known in the art.

A liquid resin or pitch bonds the grain and fine particulate during manufacture. The liquid resin or pitch content comprises preferably between about 1% and about 8% by weight of the refractory. By way of example and not limitation, liquid resins such as phenolic resole or novolak resins may be used. In accordance with one embodiment of the present invention, a novolak resin is used with hexamethylenetetramine as a curing agent. Pitch derived from coal tar or petroleum may be used as a bonding material. As will be appreciated by those skilled in the art, other resins, such as urethanes, resorcinol-formaldehyde and epoxy resins, may also be used.

According to one aspect of the present invention, the liquid resin bonding material yields carbon upon pyrolysis at very high temperatures (such as temperatures found in a slagging coal gasifier). In other words, the organic compounds in the resin or pitch bonding material form carbon when subjected to very high temperatures. As shall be described in greater detail below, the carbon within the refractory improves resistance to slag penetration.

Additional carbon in the range up to about 10% by weight may be added to the refractory mix to increase the carbon content of the refractory. As indicated above, the additional carbon may be in the form of carbon black, graphite powder, coke powder, powdered resin, powdered pitch, or the like.

Depending on the carbon content of the refractory, metal powders are added in the range up to 8%. The metal powders act as "oxygen getters" to protect the carbon bond from oxidation at elevated temperatures.

The refractory components set forth above are mixed by a conventional mixer to thoroughly distribute the respective components and to produce a refractory product having a uniform composition. The mixed refractory material is then pressed into a desired shape and heated to a temperature sufficient to cure the liquid resin or to partially pyrolyze the pitch binder. Preferably, the refractory material is cured at a relatively low temperature below 260° C. The present invention shall now be further described by way of example.

Table I illustrates three (3) compositions of a chromia-alumina refractory formed in accordance with the present invention. In Table I, particle sizes are set forth in Tyler mesh sizes, wherein, by way of example, the legend "4/10 mesh" means a particle sized less than 4 Tyler mesh (4.75 mm), but greater than 10 Tyler mesh (1.70 mm), and the legend "−28 mesh" means a particle sized less than 28 Tyler mesh (600 μm).

TABLE I

Brick Compositions

| | Composition | | |
|---|---|---|---|
| | No. 1 Resin Bond | No. 2 Resin Bond | No. 3 Resin Bond |
| Fused Chrome Alumina CA95 4/10 mesh (4.75 mm/1.70 mm) | 25.2 | 25.2 | 21.9 |
| Fused Chrome Alumina CA95 10/28 mesh (1.70 mm/600 μm) | 25.3 | 25.3 | 21.9 |
| Fused Chrome Alumina CA95 −28 mesh (600 μm) | 24.5 | 24.5 | 21.2 |
| Fused Magnesia Chrome (20%) 3/6 mesh (6.70 mm/3.35 mm) | | | 2.0 |
| Fused Magnesia Chrome (20%) 6/16 mesh (3.35 mm/1.00 μm) | | | 2.0 |
| Fused Magnesia Chrome (20%) −16 mesh (1.00 mm) | | | 4.5 |
| Fused Magnesia Chrome (20%) −48 mesh (300 μm) | | | 1.5 |
| Pigment Grade Chromic Oxide | 19 | 17 | 17 |
| Aluminum Metal Powder | 4.5 | 4.5 | 4.5 |
| Powdered Silicon | 1.5 | 1.5 | 1.5 |
| Carbon Black | | 2.0 | 2.0 |
| | 100% | 100% | 100% |
| Liquid Resole Resin | +3.2 | +3.2 | +3.58 |

All three (3) compositions contain a fused aggregate having approximately 95% $Cr_2O_3$ by chemical analysis, with the balance being primarily $Al_2O_3$. Further, all three (3) compositions contain aluminum and silicon powder. Mix No. 1 is bonded with resole resin. Mix No. 2 is similar to Mix No. 1 except that about 2% carbon black is added to increase the carbon content of the refractory. In Mix No. 3, 10% of the fused 95% $Cr_2O_3$ aggregate is replaced by a fused magnesia-chrome grain that contains approximately 59% MgO and 20% $Cr_2O_3$ by chemical analysis.

The mixes were prepared in a high-intensity Eirich mixer, and were dry mixed for one minute and then wet mixed for three to six minutes (not allowing the temperature to exceed 38° C.). The mixes were pressed to 18,000 psi on a hydraulic press using de-airing processes known to the art. Each mix was pressed into a 9"×4.5"×2" flat brick. The bricks were then cured at 177° C., and then cut into 2"×2"×9" soaps, 2"×2"×2" cubes, and 1"×1"×6" bars prior to testing.

Coal gasification slag tests were performed on bricks formed from the three (3) mixes. The experimental test results of the three (3) mixes are set forth in Table II, together with results from tests on a conventional 90% chromia-content burned chromia-alumina brick.

TABLE II

Test Results

| Mix | Conventional 90% $Cr_2O_3$—Content Burned Chromia-Alumina Brick | Composition | | |
|---|---|---|---|---|
| | | No. 1 | No. 2 | No. 3 |
| Green Bulk Density, pcf | 273 | 268 | 261 | 255.5 |
| Temperature of Heat Treatment after Pressing: | 2700° F. | 350° F. | 350° F. | 350° F. |
| Properties after Heat Treatment: | | | | |
| Bulk Density, pcf | 266 | 267.4 | 260.1 | 252.8 |
| App. Porosity, % | 15.8 | 4.6 | 4.0 | 4.3 |
| Apparent Specific Gravity | 5.05 | 4.49 | 4.34 | 4.23 |
| Permeability, centidarcies | 33 | 0.08 | 0.06 | 0.06 |
| Room Temperature MOR Soaps, psi | 2220 | 4300 | 4600 | 3800 |
| Room Temperature CCS, psi | 7,000 | *>23,500 | 21,700 | *>23,500 |
| Oxidation Cubes, 5 hours at 2000° F., mm | — | 0.0 | 0.0 | 0.0 |
| Oxidation Cubes, 5 hours at 2550° F., mm | — | 0.2 | 0.2 | 0.2 |
| Coal Gasifier Slag Test: | | | | |
| Sample Erosion % | None | None | None | None |
| Slag Penetration, mm2 | 416 | None | None | None |
| Sample Oxidation, mm2 | N/A | **1000 | **905 | **1000 |
| Properties after Coking 1800° F.: | | | | |
| % Linear Change | — | 0.1 | 0.2 | 0.2 |
| Bulk Density, pcf | — | 263.6 | 255.7 | 249.4 |
| App. Porosity, % | — | 12.0 | 12.8 | 12.7 |
| Apparent Specific Gravity | — | 4.80 | 4.69 | 4.57 |
| Room Temperature MOR Bars, psi | — | 4200 | 4300 | 3200 |
| Properties after Reheat 2910 F.: | | | | |
| Density, pcf | — | 246 | 235 | 214 |
| Linear Change, % | +1.0 @3140 F. | +2.4 | +2.3 | +4.4 |
| Volume Change, % | — | +8.1 | +7.2 | +15.0 |

*>indicates CCS maximum measure for equipment
**Slight loss of carbon in affected sample area Coked bars were fired to 1800° F. (982.2° C.) in a carbon-filled metal box prior to testing.

As shown in Table II, the conventional 90% $Cr_2O_3$-content burned chromia-alumina brick exhibited 416 $mm^2$ of penetration in a coal gasification slag test, while the resin-bonded compositions of Mixes Nos. 1, 2 and 3 exhibited none. It was totally unexpected that there would be a complete lack of corrosion and penetration of slag beyond the immediate hot face of the resin bonded compositions because conventional thinking was that the carbon would be oxidized by reduction of $Cr_2O_3$ in the brick, rending the carbon ineffective. The slag penetration observed in the conventional 90% $Cr_2O_3$-content burned chromia-alumina brick resulted in corrosion of the bond phase, and caused chemical reactions that have been observed to be expansive, which can cause surfaces of the brick to spall in service.

This wear mechanism, i.e., spalling, would not occur in the resin-bonded compositions of Mixes Nos. 1, 2 and 3 because of the complete lack of slag penetration seen in the test. Other advantages in Mixes Nos. 1, 2 and 3 include higher room temperature strength and decreases in porosity and permeability.

Substituting extra carbon for some chromic oxide (Refractory Mix No. 2) lowered the density of the refractory as expected, but did not affect any other properties tested.

Likewise, substituting fused magnesia-chrome grains for fused chromia-alumina grains (Refractory Mix No. 3) lowered the density of the refractory, lowered strengths slightly, and increased reheat expansion to a degree, but did not affect other measured properties. Refractory Mix No. 3 thus shows that the benefits resulting from no slag penetration are achieved even in compositions containing fused magnesia-chrome grains.

The mineralogical examinations described below on bricks demonstrate that the carbon did in fact reduce some of the chromia in these resin-bonded refractories during slag testing. Surprisingly, however, despite this reduction of chromia, the resin-bonded bricks described herein substantially outperformed the conventional 90% $Cr_2O_3$-content burned chromia-alumina brick with regards to slag penetration.

Although there was reduction of chromia in both slag-altered and unaltered regions of the hot faces of the disclosed refractories, the compositions exhibited excellent resistance to slag penetration and corrosion, and had much better resistance to slag penetration than conventional chromia-alumina brick. While this reduction of chromia is undesirable, it was found that the benefit of reduced slag penetration associated with the presence of carbon completely overcame the negative effect of the reduction of chromia within the refractory. As shown in Table II, the resulting performance of bricks formed according to the present invention is substantially improved over the conventional burned chromia-alumina brick.

This improved performance of carbon-containing, chromia-alumina brick was surprising not just because it would have been expected that reduction of chromia would be a problem; it was also surprising that the carbon-containing brick did not have to be high-fired to obtain good performance. Typically, high firing has been employed to develop bonding in the brick, particularly to develop chromia-alumina solid solution bonding. Carbon-containing chromia-alumina bricks formed according to Mix Nos. 1, 2 and 3 were cured at 175° C., yet they exhibited good performance and outperformed the conventional burned bricks in the aforementioned slag testing.

Conventional Burned Chromia-Alumina Brick

Figure 1:
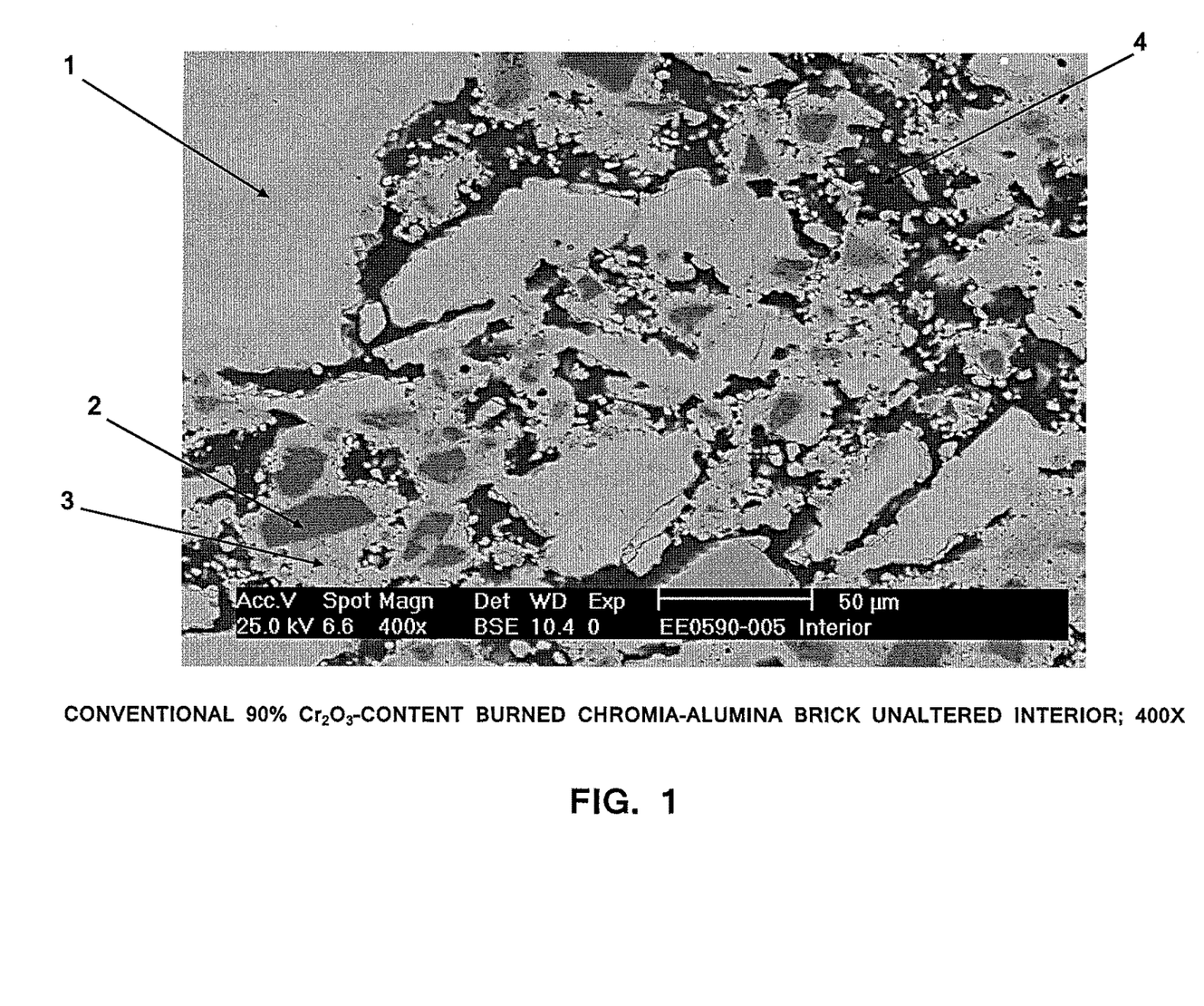
FIG. 1 is a cross-sectional view (digital image) at 400 times magnification, taken using a scanning electron microscope (SEM), showing an interior region of a conventional 90% $Cr_2O_3$-content burned chromia-alumina brick after exposure to a coal gasification slag test.
Figure 2:
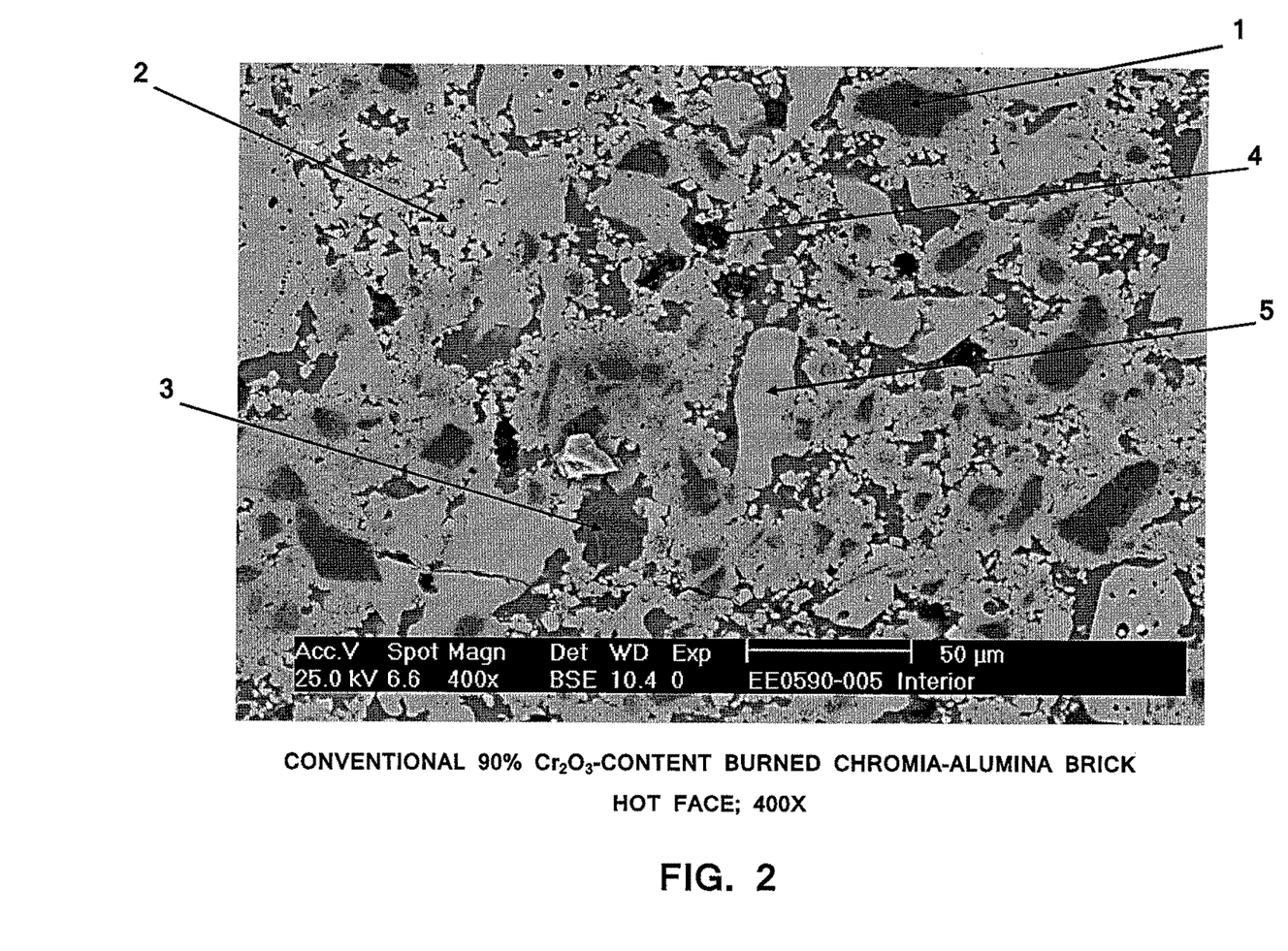
FIG. 2 is a cross-sectional view (digital image) at 400 times magnification, taken using a scanning electron microscope (SEM), showing the hot face of the conventional 90% $Cr_2O_3$-content burned chromia-alumina brick of FIG. 1 after exposure to a coal gasification slag test.

Referring now to FIGS. 1 and 2, a conventional 90% $Cr_2O_3$-content, burned chromia-alumina brick is shown after exposure to slag in a coal gasification slag test. FIG. 1 shows an interior region of the refractory that is essentially unaltered by slag penetration. FIG. 2 shows the hot face of the refractory. Optical microscopic and scanning electron microscope (SEM) examination of the unaltered portion of the 90% $Cr_2O_3$-content burned chromia-alumina brick (FIG. 1) showed that it was composed of fused chromia-alumina grain within a chromic oxide-rich, chromia-alumina solid solution bonded matrix. A few alumina grains were present throughout the matrix. In FIG. 1, the reference numbers represent the following:
1. Fused Chromia-Alumina Grain
2. Alumina Grain
3. Chromic Oxide-rich Solid Solution Bonded Matrix
4. Void/Epoxy Examination of the hot face (FIG. 2) showed penetration of the glassy Ca—Al—Si—O-rich slag to approximately the 5 mm depth. No significant chemical alteration was apparent. The slag was primarily filling the porosity resulting in a densified microtexture. In FIG. 2, the reference numbers represent the following:
1. Alumina Grain
2. Chromic Oxide-rich Solid Solution Bonded Matrix
3. Slag-related Ca—Al—Si—O-rich Glassy Phase
4. Void/Epoxy
5. Fused Chromia-Alumina Grain Refractory Mix No. 1

Figure 3:
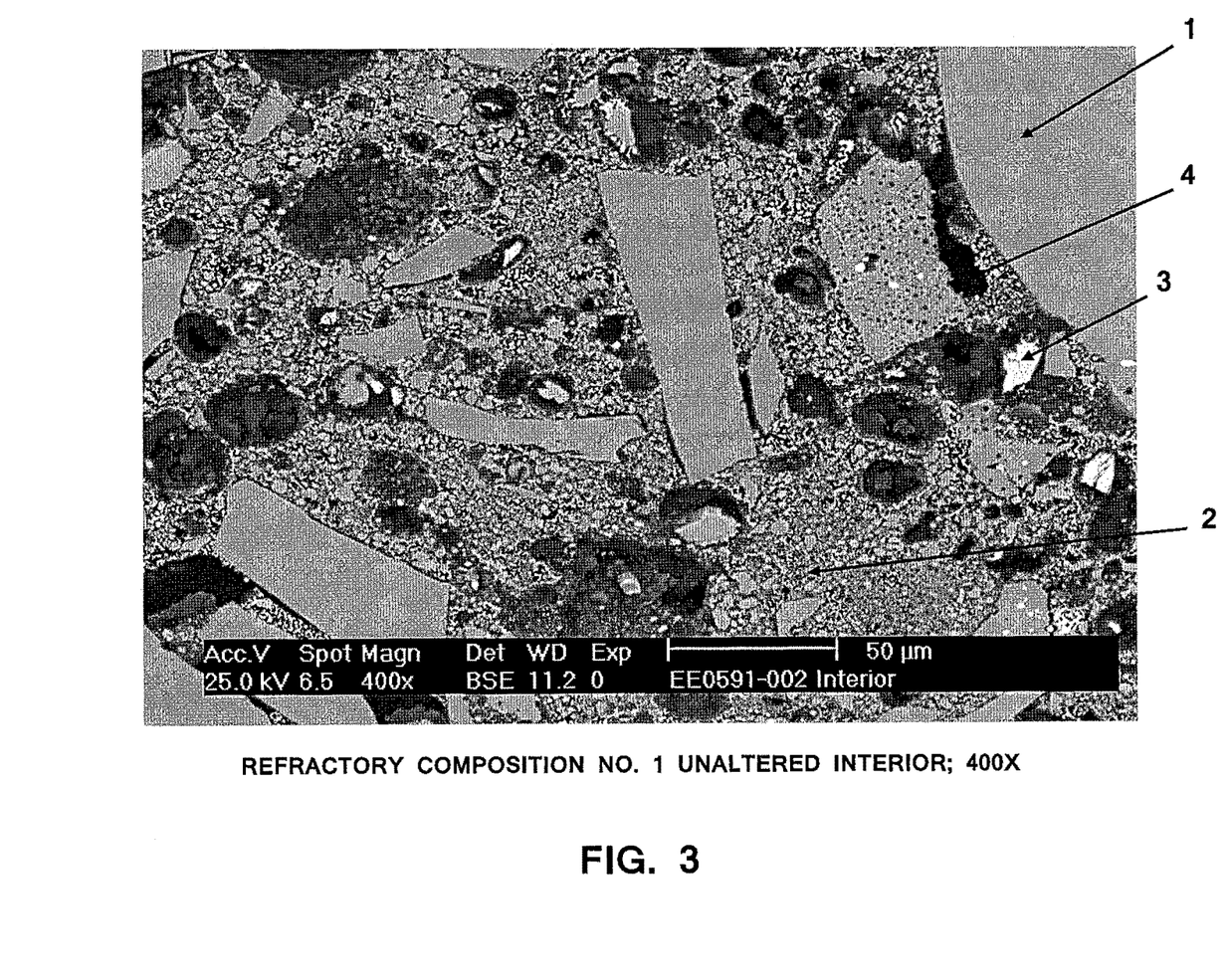
FIG. 3 is a cross-sectional view (digital image) at 400 times magnification, taken using a scanning electron microscope (SEM), showing an interior region of a first refractory formed according to the present invention after exposure to a coal gasification slag test.
Figure 4:
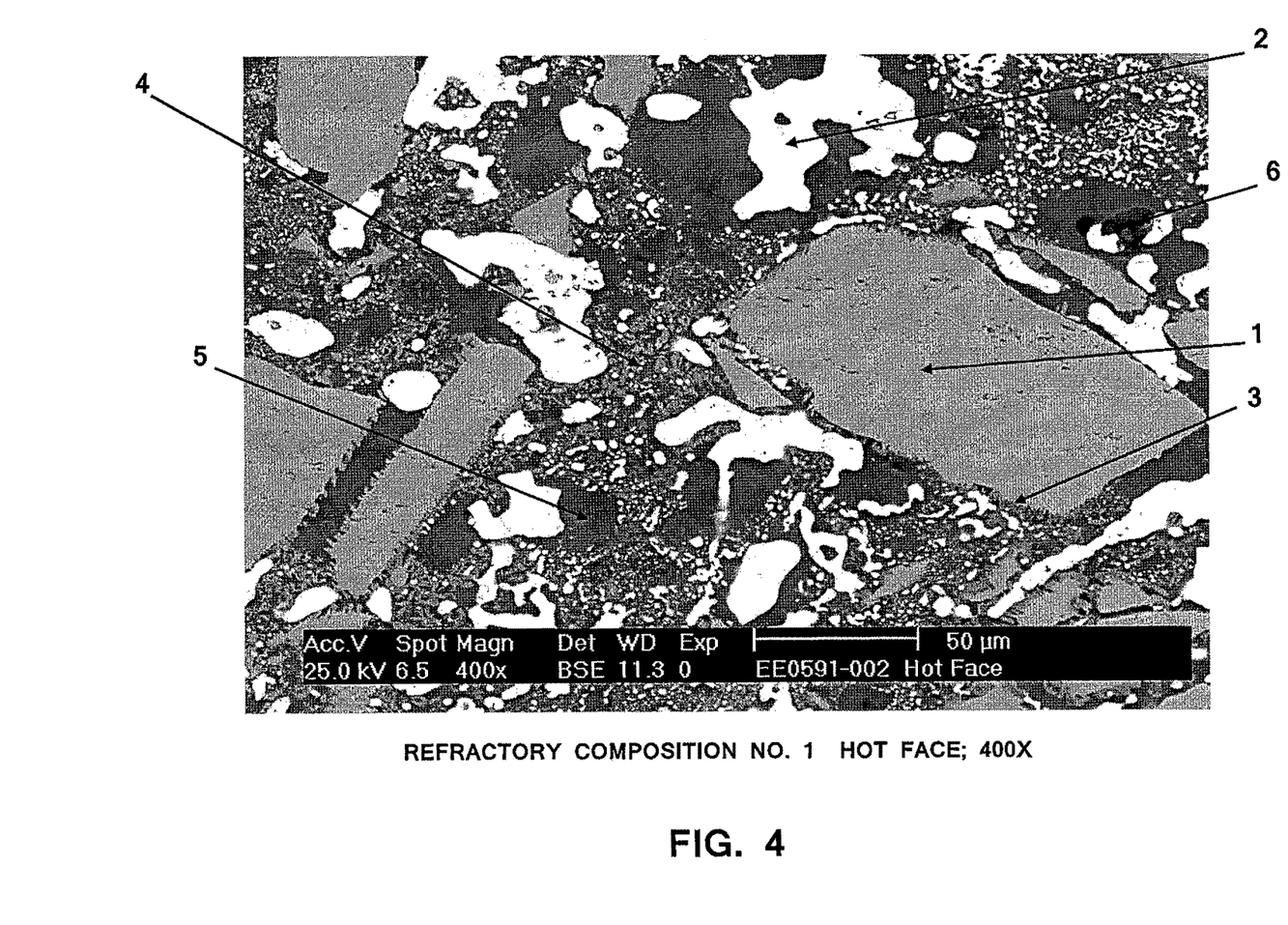
FIG. 4 is a cross-sectional view (digital image) at 400 times magnification, taken using a scanning electron microscope (SEM), showing the hot face of the first refractory after exposure to a coal gasification slag test.

Referring now to FIGS. 3 and 4, a refractory formed according to Refractory Mix No. 1 is shown after exposure to slag in a coal gasification slag test. FIG. 3 shows an interior region of the refractory that is essentially unaltered by slag penetration. FIG. 4 shows the hot face of the refractory. Optical microscopic and scanning electron microscope (SEM) examination of the unaltered interior of the refractory (FIG. 3) showed that the product was composed of fused chromia-alumina grain within a chromic oxide enriched, resin bonded matrix. The majority of the metals appeared to have oxidized. A few areas within the interior showed high reflective areas that SEM energy dispersive spectroscopy (EDS) indicated were primarily composed of Cr—Si or Cr—Si—Al. In FIG. 3, the reference numbers represent the following:
1. Fused Chromia-Alumina Grain
2. Chromic Oxide-Enriched Resin Bonded Matrix
3. Cr—Si and Cr—Si—Al Metallics
4. Void/Epoxy The hot face of the refractory (FIG. 4) had a thin Ca—Al—Si—O-rich glassy slag coating. Approximately a 0.5 mm thick densified zone was evident at the hot face. This zone was composed of fused chromia-alumina grains in a glass densified, chromic oxide-rich matrix. SEM energy dispersive spectroscopy (EDS) showed that a high reflective Cr-rich, Cr—Fe metallic phase was present within this zone. This suggested that reduction of some of the chromia had occurred; the iron was presumably associated with the slag. Below the densified zone, the sample exhibited a somewhat more open, porous texture. This textural feature was presumably due to oxidation of the carbon bond and oxidation of the metallic additions. SEM EDS of the matrix to approximately the 3-4 mm depth continued to show slag-related components (soda, potash and, to a lesser extent, lime). Below the 3-4 mm depth, no slag penetration was evident. In FIG. 4, the reference numbers represent the following:
1. Fused Chromia-Alumina Grain
2. Cr—Fe Metallic
3. Cr—Al—Ca—Si—K Phase 4. Slag Penetrated Matrix
5. Ca—Al—Si—O-rich Glassy Phase
6. Void/Epoxy Refractory Mix No. 2

Figure 5:
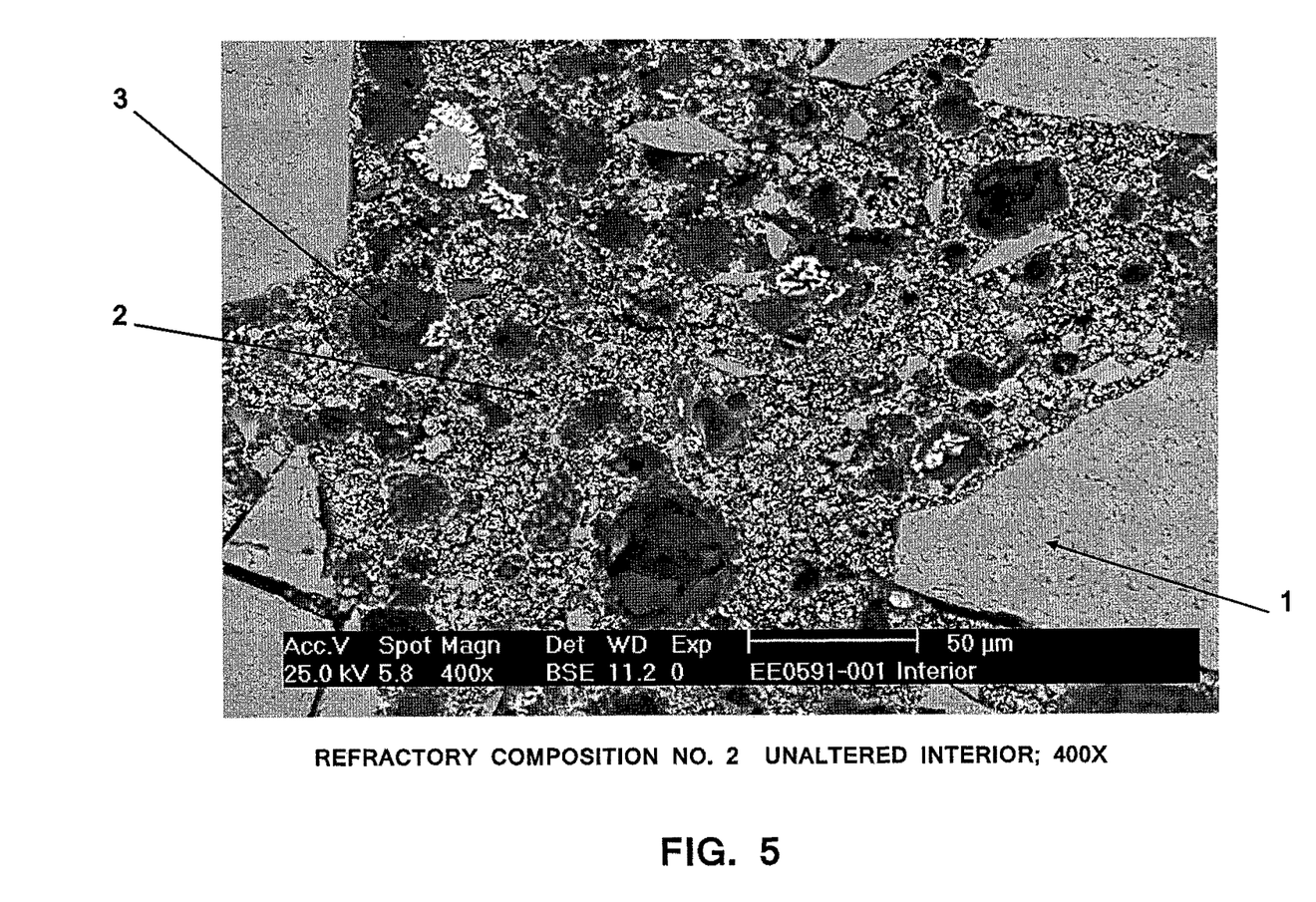
FIG. 5 is a cross-sectional view (digital image) at 400 times magnification, taken using a scanning electron microscope (SEM), showing an interior region of a second refractory formed according to the present invention after exposure to a coal gasification slag test.
Figure 6:
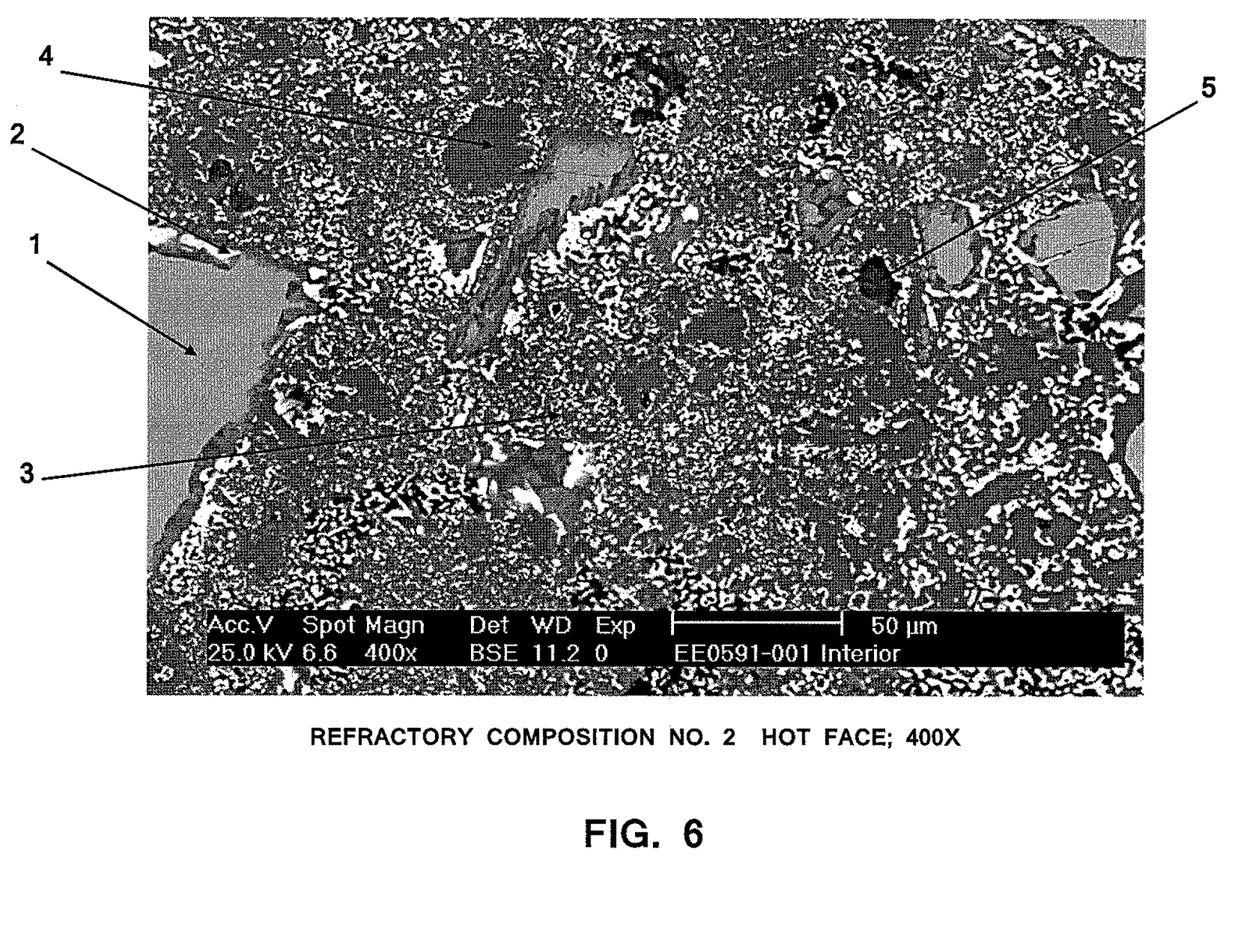
FIG. 6 is a cross-sectional view (digital image) at 400 times magnification, taken using a scanning electron microscope (SEM), showing the hot face of the second refractory after exposure to a coal gasification slag test.

Referring now to FIGS. 5 and 6, a refractory formed according to Refractory Mix No. 2 is shown after exposure to slag in a coal gasification slag test. FIG. 5 shows an interior region of the refractory that is essentially unaltered by slag penetration. FIG. 6 shows the hot face of the refractory. Optical microscopic and scanning electron microscope (SEM) examination of the unaltered interior of the refractory (FIG. 5) showed that the product was composed of fused chromia-alumina grain within a chromic oxide enriched, resin bonded matrix. No metals were evident; they had presumably oxidized during the slag test. In FIG. 5, the reference numbers represent the following:

1. Fused Chromia-Alumina Grain
2. Chromic Oxide-Enriched Resin Bonded Matrix
3. Void/Epoxy The hot face of the refractory (FIG. 6) had a thin Ca—Al—Si—O-rich glassy slag coating. In FIG. 6, the reference numbers represent the following:

1. Fused Chromia-Alumina Grain
2. Cr/Cr—O Phase
3. Slag Penetrated Matrix
4. Glassy Slag
5. Void/Epoxy A few of the coarser fused grains were floating into the slag at the immediate hot face. This suggested that matrix disruption had occurred. Approximately a 0.5 mm thick densified zone was evident at the hot face. This zone was composed of fused chromia-alumina grains in a glass densified, chromic oxide-rich matrix. SEM energy dispersive spectroscopy (EDS) showed that the high reflective periphery of several of the fused grains, as well as fine high reflective areas throughout the matrix, were primarily composed of Cr and, to a lesser extent, Cr with only trace oxygen. This suggested that reduction of some of the chromic oxide had occurred, presumably associated with the presence of the resin bond and the carbon black. Below the densified zone, the sample exhibited a somewhat more open, porous texture; this textural feature was presumably due to oxidation of the carbon bond and oxidation of the metallic additions. SEM EDS of the matrix to approximately the 3-4 mm depth continued to show slag-related components (soda, potash and, to a lesser extent, lime). Below the 3-4 mm depth, no slag penetration was evident.

Refractory Mix No. 3

Figure 7:
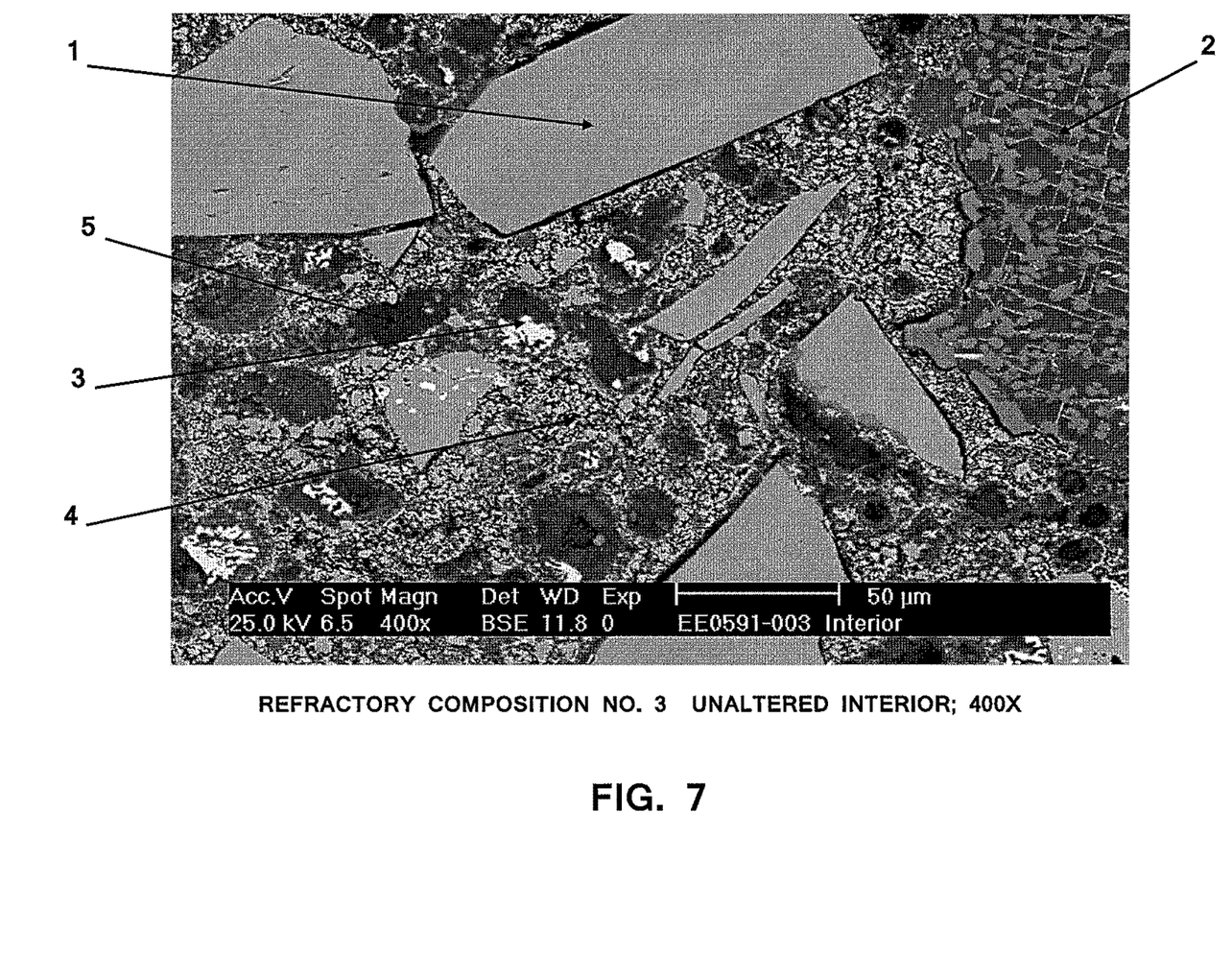
FIG. 7 is a cross-sectional view (digital image) at 400 times magnification, taken using a scanning electron microscope (SEM), showing an interior region of a third refractory formed according to the present invention after exposure to a coal gasification slag test.
Figure 8:
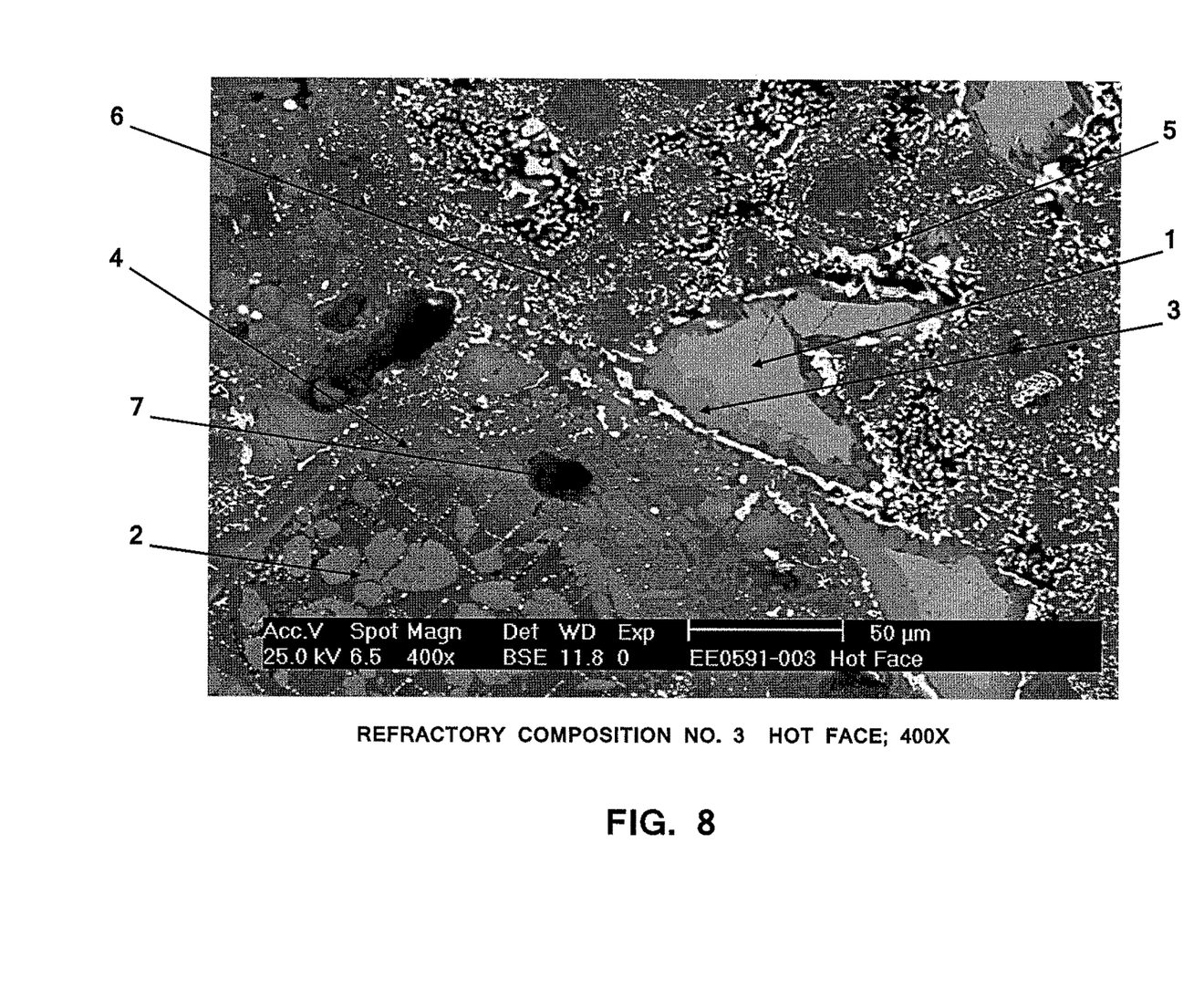
FIG. 8 is a cross-sectional view (digital image) at 400 times magnification, taken using a scanning electron microscope (SEM), showing the hot face of the third refractory after exposure to a coal gasification slag test.

Referring now to FIGS. 7 and 8, a refractory formed according to Refractory Mix No. 3 is shown after exposure to slag in a coal gasification slag test. FIG. 7 shows an interior region of the refractory that is essentially unaltered by slag penetration. FIG. 8 shows the hot face of the refractory. Optical microscopic and scanning electron microscope (SEM) examination of the unaltered interior of the refractory (FIG. 7) showed that the product was composed of fused chromia-alumina grain and fused magnesia-chrome grain within a chromic oxide enriched, resin bonded matrix. In FIG. 7, the reference numbers represent the following:

1. Fused Chromia-Alumina Grain
2. Fused Magnesia-Chrome Grain
3. Cr-rich, Cr—Si Metallic
4. Chromic Oxide Enriched Resin Bonded Matrix
5. Void/Epoxy The majority of the metals appeared to have oxidized. A few areas within the interior showed high reflective areas that SEM EDS indicated were primarily composed of Cr—Si.

The hot face of the refractory (FIG. 8) had a thin Ca—Al—Si—O-rich glassy slag coating. In FIG. 8, the reference numbers represent the following:

1. Fused Chromia-Alumina Grain
2. Fused Magnesia-Chrome Grain
3. Cr—Mg—Al—O Spinel Phase
4. Mg—Al—Si—Ca—Fe—O-rich Phase in Mg—Al—Si—Ca—Fe—O-rich Glass
5. Cr-rich Metallic
6. Slag Penetrated Matrix
7. Void/Epoxy Approximately a 0.5 mm thick densified zone was evident at the immediate hot face. This zone was composed of fused chromia-alumina grains and remnant fused magnesia-chrome grains in a glass densified, chromic oxide-rich matrix. Minor reaction resulting in the formation of a Cr—Mg—Al—O spinel phase was evident at the periphery of the fused chromia-alumina grains. The fused magnesia-chrome grains showed greater reaction at the grain periphery. These reacted areas were characterized by a Mg—Al—Si—Ca—Fe—O-rich phase in Mg—Al—Si—Ca—Fe—O-rich glass; some fine Fe-rich metallics were also present in these areas. SEM energy dispersive spectroscopy (EDS) showed that the high reflective Cr-rich metallic phase was present within this 0.5 mm zone. This suggested that reduction of some of the chromic oxide had occurred. Below this approximately 0.5 mm zone, the sample exhibited a somewhat more open, porous texture; this textural feature was presumably due to oxidation of the carbon bond and oxidation of the metallic additions. SEM EDS of the matrix to approximately the 3-4 mm depth continued to show slag-related components (soda, potash and, to a lesser extent, lime). Below the 3-4 mm depth, no slag penetration was evident.

The foregoing description relates to specific embodiments of the present invention. It should be appreciated that this embodiment is described for purposes of illustration only, and that numerous alterations and modifications may be practiced by those skilled in the art without departing from the spirit and scope of the invention. While the invention has been described with respect to refractories for slagging coal gasifiers, it will be appreciated that carbon-containing chromia-alumina compositions according to the present invention would find advantageous application in various other situations containing highly aggressive, fluid slags. In this respect, refractory compositions according to the present invention are not limited to coal gasifiers. It is intended that all such modifications and alterations be included insofar as they come within the scope of the invention as claimed or the equivalents thereof.

Having described the invention, the following is claimed:

1. A high-chromia refractory, comprised of:
   a mixture of,
   about 60% to about 99% by weight of refractory grain, wherein said refractory grain is comprised of grains having about 20% to 100% by weight chromia;
   0% to about 35% by weight of a fine particulate, said fine particulate selected from chromic oxide, alumina, ceria, yttria, lanthanum oxide, or combinations thereof; and
   carbon derived from the pyrolysis of resin or pitch, said resin or pitch present in said refractory prior to pyrolysis in an amount of about 1% to about 8% by weight, said refractory grain, said fine particulate and said carbon being mixed and uniformly distributed in said refractory.

2. A high-chromia refractory, comprising:
   about 60% to about 99% by weight of refractory grain, wherein said refractory grain is comprised of about 20% to 100% by weight chromia;

0% to about 35% by weight of a fine particulate, said fine particulate selected from chromic oxide, alumina, ceria, yttria, lanthanum oxide, or combinations thereof;

about 1% to about 8% by weight of a liquid resin or pitch; and 0.1% to about 10% added carbon.

3. A high-chromia refractory, comprising:

about 60% to about 99% by weight of refractory grain, wherein said refractory grain is comprised of about 20% to 100% by weight chromia;

0% to about 35% by weight of a fine particulate, said fine particulate selected from chromic oxide, alumina, ceria, yttria, lanthanum oxide, or combinations thereof;

about 1% to about 8% by weight of a liquid resin or pitch; and 0.1% to about 8% metal powders, said metal powders selected from Si, Al, Fe, Cr, Mg, alloys of Si, Al, Fe, Cr, Mg, or combinations thereof.

4. A refractory as defined in claim 1, 2 or 3, further comprising:

0.1% to 20% by weight of a non-chromia grain having a particle size of about 3 Tyler mesh (6.70 mm) or finer.

5. A refractory as defined in claim 4, wherein said non-chromia grain is comprised of alumina or magnesia.

6. A refractory as defined in claim 2, wherein said added carbon is comprised of a material selected from carbon black, graphite, coke, powdered resin, powdered pitch, or combinations thereof.

7. A refractory as defined in claim 1, 2 or 3, wherein said fine particulate has a particle size finer than 65 Tyler mesh (212 μm).

8. A refractory as defined in claim 1, 2 or 3, wherein said refractory grain is comprised of chromia-alumina.

9. A high-chromia refractory as defined in claim 1, wherein said grain is comprised of:

about 60% to about 99% by weight of refractory grain, wherein said refractory grain is comprised of picrochromite;

0% to about 35% by weight of a fine particulate, said fine particulate selected from chromic oxide, alumina, ceria, yttria, lanthanum oxide, or combinations thereof; and about 1% to about 8% of a liquid resin or pitch.

10. A refractory as defined in claim 1, 2 or 3, wherein said refractory grain is comprised of coarse grains having a particle size between about 3 Tyler mesh (6.70 mm) and 325 Tyler mesh (45 gm).

11. A refractory as defined in claim 3, wherein said non-chromia grain has a particle size less than 3 Tyler mesh (6.70 mm).

12. A refractory as defined in claim 1, 2 or 3, wherein said refractory grain is comprised of refractory grains having about 65% to 100% by weight chromia.

13. A refractory as defined in claim 1, 2 or 3, wherein said refractory grain is comprised of grains having the same chromia content.

14. A refractory, comprised of:

about 60% to about 99% by weight of a refractory grain, wherein said refractory grain is comprised of grains having chromia contents of about 20% to about 100% by weight;

about 1% to about 6% resin or pitch;

a carbonaceous material;

metal powders selected from Si, Al, Fe, Cr, Mg, alloys of Si, Al, Fe, Cr, Mg or combinations thereof;

a fine particulate selected from chromic oxide, alumina, ceria, yttria, lanthanum oxide, or combinations thereof; and picrochromite.

15. A refractory as defined in claim 14, wherein said refractory grain is comprised of grains having about 65% to 100% by weight chromia.

16. A refractory as defined in claim 14, wherein said fine particulate has a particle size less than 65 Tyler mesh.

17. A refractory as defined in claim 14, wherein said carbonaceous material is selected from carbon black, graphite, coke, powdered resin, powdered pitch, or combinations thereof.

* * * * *